Patented Feb. 4, 1936

2,029,509

UNITED STATES PATENT OFFICE 2,029,509

ARYLAMIDES OF 2,3-HYDROXYNAPHTHOIC ACIDS

Wilfred Archibald Sexton, Huddersfield, England, assignor to Imperial Chemical Industries Limited, a corporation of Great Britain No Drawing. Application January 10, 1934, Serial No. 706,145. In Great Britain December 23, 1932

4 Claims. (Cl. 260—124)

This invention relates to new derivatives of naphthalene, and more particularly refers to arylamides of 2,3-hydroxy-naphthoic acid having the following general formula:

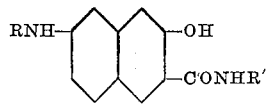

in which R and R' represent the radicals of primary aromatic amines.

It is an object of this invention to produce new organic compounds particularly adapted for use as dye intermediates. A further object is to produce 2,3-hydroxy-naphthoic acids having an arylamine group substituted in the 7-position of the naphthalene nucleus. A still further object is to convert the aforementioned naphthoic acid derivatives to their corresponding arylamides. An adidtional object is to produce new intermediates for use as ice color coupling components. Additional objects will become apparent from a consideration of the following description.

These objects are attained, according to my invention, by reacting 2,7-dihydroxy-naphthalene-3-carboxylic acid with a primary aromatic amine to give 2-hydroxy-7-arylamino-naphthalene-3-carboxylic acid. The latter is then condensed with an arylamine in the usual manner for amide formation, that is in the presence of acid condensing agents, to form the corresponding 2-hydroxy-7-arylamino-3-naphthoic acid arylide.

The invention may be more readily understood by a consideration of the following illustrative examples, in which the quantities are stated in parts by weight.

Example 1

30 parts of 2,7-dihydroxy-naphthalene-3-carboxylic acid (Schmid, Ber., 1893, 26, 1117) were mixed with 90 parts of aniline and the mixture was heated with agitation until 2.5 parts of water had been distilled off. The product was then poured into an excess of cold dilute hydrochloric acid whereby the excess of aniline was dissolved, leaving the crude reaction product behind. This was purified by dissolving in dilute sodium carbonate, filtering from insoluble matter and acidification of the filtrate by hydrochloric acid. The 7-phenylamino-2-hydroxy-3-naphthoic acid obtained was a greenish-yellow powder, M. P. 228–231°. Recrystallized from alcohol it had M. P. 231–232°.

By using instead of aniline another primary aromatic amine, other 7-arylamine-2,3-hydroxynaphthoic acids were produced, thus:—
  o-Toluidine gave an acid of M. P. 250–260°.
  p-Anisidine gave an acid of M. P. 241–244°.

Example 2

14 parts of 7-phenylamino-2,3-hydroxy-naphthoic acid were stirred with 70 parts of dry toluene at 60° C. 4.05 parts of aniline and 3 parts of phosphorus trichloride were added. The mixture was stirred and heated at 100° C. and eventually boiled under a reflux condenser until interaction was complete. It was then filtered and the new arylamide was washed with dilute aqueous sodium carbonate solution and with water. It had M. P. about 204° C.

The p-anisidide, made in a similar way, had M. P. 210–215° C.

Example 3

5 parts of the anilide of 7-phenylamine-2,3-hydroxy-naphthoic acid were pasted with 9 parts of Turkey red oil, 2 parts water and 10 parts of caustic soda 62° Tw. The paste was dissolved in 100 parts of boiling water and the solution diluted to 1000 parts with water.

50 parts of cotton were steeped in this liquor for ½ hour at 25–30° C. It was then freed from superfluous liquor and the color developed by immersion in a bath of a diazotized amine. The dyeings were washed, soaped and dried. The shades produced with various amines are tabulated below:

| Diazotized amine | Shade |
|---|---|
| m-Chloroaniline | Olive brown. |
| 2-5-dichloroaniline | Brown. |
| o-Nitroaniline | Brown. |

When in Example 3, the 7-phenylamine-2,3-hydroxy-naphthoic anilide was replaced by 3 parts of the corresponding p-anisidide and the caustic soda was reduced to 6 parts the following shades were obtained:

| Diazotized amine | Shade |
|---|---|
| m-Chloroaniline | Olive brown. |
| 2-5-dichloroaniline | Brown. |
| o-Nitroaniline | Reddish-brown. |

It is understood that the aforementioned examples merely illustrate a few of the many reactions comprised within the scope of the present invention. For example, in place of reacting said initial component with aniline, various other primary aromatic amines may be utilized, such as for example amines of the benzene, naphthalene, diphenyl, etc. series. It is to be understood that these amines may have one or more groups substituted thereon. Since one of the prime objects of this invention is to produce ice color coupling components, when the new compounds falling within the scope of this invention are to be used for such purpose it is advisable that the groups substituted on the primary aromatic amino nucleus be non-water-solubilizing groups. Among these non-water-solubilizing groups mention may be made of the alkyl, alkoxy, halogen, nitro, trifluoromethyl and similar well known and commonly used substituents.

When the new hydroxy-naphthoic acid derivatives produced according to the preceding instructions are to be converted into hydroxy-naphthoic arylamide derivatives this may readily be accomplished by condensing the hydroxy-naphthoic acid derivatives with primary aromatic amines. These amines may be selected from the well known aromatic series, such as the benzene, naphthalene, azobenzene, etc. As in the case of the primary aromatic amines referred to in the preceding paragraph, the present amines may likewise have one or more groups substituted thereon. When the resulting arylamide is to be used as an ice color coupling component these groups should also be non-water-solubilizing, examples of a few representative groups selected from this category having been previously given.

The present invention results in the production of new derivatives of hydroxy-naphthoic acid which have many uses in common with other naphthoic acid derivatives. This invention is further advantageous in that it produces new arylamides of the aforementioned hydroxy-naphthoic acids, these arylamides being particularly useful as ice color coupling components. In addition to their use as ice color coupling components the arylamides comprised herein may also be used in a variety of other connections well known to one skilled in the art.

As many apparently widely different embodiments of this invention may be made without departing from the spirit and scope thereof, it is to be understood that the invention is not limited to the specific embodiments thereof except as defined in the appended claims.

I claim:
1. Naphthalene derivatives having the following general formula:

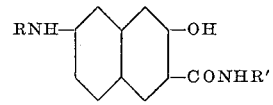

in which R and R' represent aryl radicals of the benzene or naphthalene series.

2. Naphthalene derivatives having the following general formula:

in which R and R' represent aryl radicals of the benzene series which have no water-solubilizing groups substituted thereon.

3. The anilide of 2-hydroxy-7-phenylamino-naphthalene-3-carboxylic acid.

4. The p-anisidide of 2-hydroxy-7-phenyl-amino-naphthalene-3-carboxylic acid.

WILFRED ARCHIBALD SEXTON.